(12) United States Patent
Humphrey (10) Patent No.: US 9,098,086 B2
(45) Date of Patent: Aug. 4, 2015

(54) METHOD AND SYSTEM FOR PLANNING A TURN PATH FOR A MACHINE

(75) Inventor: James Decker Humphrey, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 364 days.

(21) Appl. No.: 13/568,271

(22) Filed: Aug. 7, 2012

(65) Prior Publication Data

US 2014/0046530 A1 Feb. 13, 2014

(51) Int. Cl.
*G05D 1/02* (2006.01)
*B62D 15/02* (2006.01)
*B60W 30/10* (2006.01)
*B60W 30/18* (2012.01)

(52) U.S. Cl.
CPC ............ *G05D 1/0217* (2013.01); *B60W 30/10* (2013.01); *B60W 30/18145* (2013.01); *B60W 30/18154* (2013.01); *B62D 15/025* (2013.01); *B60W 2530/10* (2013.01); *B60W 2550/142* (2013.01); *B60W 2550/146* (2013.01); *B60W 2550/40* (2013.01); *B60W 2550/402* (2013.01); *B60W 2720/10* (2013.01); *B60Y 2200/41* (2013.01); *G05D 2201/0202* (2013.01)

(58) Field of Classification Search
CPC B62D 15/0265; B62D 15/025; G01S 13/867; G01S 13/931; G01S 2013/9342; G01S 2013/9353; G05D 1/0217; G05D 2201/0202; B60Y 2200/41; B60W 30/18145; B60W 30/18154; B60W 2530/10; B60W 2550/142; B60W 2550/146; B60W 2550/40; B60W 2550/402; B60W 2720/10
See application file for complete search history.

(56) References Cited

U.S. PATENT DOCUMENTS

| | | | |
|---|---|---|---|
| 5,568,030 A | 10/1996 | Nishikawa et al. | |
| 5,684,696 A | 11/1997 | Rao et al. | |
| 6,134,502 A | 10/2000 | Sarangapani | |
| 6,269,308 B1 | 7/2001 | Kodaka et al. | |
| 6,292,725 B1 | 9/2001 | Kageyama et al. | |
| 6,370,452 B1 | 4/2002 | Pfister | |
| 6,442,456 B2 | 8/2002 | Burns et al. | |
| 6,799,100 B2 | 9/2004 | Burns et al. | |
| 7,596,451 B2 | 9/2009 | Stoller et al. | |
| 7,630,806 B2 * | 12/2009 | Breed | 701/45 |
| 7,739,006 B2 * | 6/2010 | Gillula | 701/24 |
| 8,126,642 B2 * | 2/2012 | Trepagnier et al. | 701/423 |
| 8,140,239 B2 | 3/2012 | Stratton et al. | |
| 8,670,932 B2 * | 3/2014 | Hartman | 701/445 |
| 8,682,035 B2 * | 3/2014 | Stiegler | 382/104 |

(Continued)

FOREIGN PATENT DOCUMENTS

JP 61-231608 10/1986

*Primary Examiner* — James Trammell
*Assistant Examiner* — James E Stroud
(74) *Attorney, Agent, or Firm* — Finnegan, Henderson, Farabow, Garrett & Dunner, LLP (57) ABSTRACT

A system for controlling a first machine performing a turn includes a controller configured to identify a desired turn for the first machine. The desired turn is formed by two adjacent traffic lanes. The two traffic lanes include a first traffic lane and a second traffic lane. The controller is further configured to receive information regarding a second machine and determine whether to control the first machine to follow a lane crossing path for performing the desired turn based on the received information. The lane crossing path includes a portion of the first traffic lane and a portion of the second traffic lane such that the first machine changes between the first traffic lane and the second traffic lane to perform the desired turn.

21 Claims, 4 Drawing Sheets

(56) References Cited

U.S. PATENT DOCUMENTS

| | | | |
|---|---|---|---|
| 8,706,394 B2* | 4/2014 | Trepagnier et al. | 701/301 |
| 8,717,156 B2* | 5/2014 | Tronnier et al. | 340/435 |
| 8,744,742 B2* | 6/2014 | Nishimaki et al. | 701/301 |
| 8,755,997 B2* | 6/2014 | Au et al. | 701/301 |
| 2002/0036584 A1 | 3/2002 | Jocoy et al. | |
| 2007/0282532 A1 | 12/2007 | Yamamoto et al. | |
| 2008/0027591 A1 | 1/2008 | Lenser et al. | |
| 2008/0162027 A1* | 7/2008 | Murphy et al. | 701/117 |
| 2009/0063031 A1 | 3/2009 | Greiner et al. | |
| 2009/0150039 A1 | 6/2009 | Perisho, Jr. et al. | |
| 2009/0222186 A1 | 9/2009 | Jensen | |
| 2011/0077864 A1 | 3/2011 | Konijnendijk | |
| 2011/0118927 A1 | 5/2011 | Cima | |
| 2011/0153117 A1 | 6/2011 | Koch et al. | |
| 2011/0153541 A1 | 6/2011 | Koch et al. | |
| 2011/0260846 A1 | 10/2011 | Mochizuki et al. | |
| 2012/0136524 A1 | 5/2012 | Everett et al. | |

\* cited by examiner

METHOD AND SYSTEM FOR PLANNING A TURN PATH FOR A MACHINE

TECHNICAL FIELD

The present disclosure relates generally to a method and system for planning a path for a machine, and more particularly, to a method and system for planning a turn path for a machine.

BACKGROUND

Machines such as haul trucks, loaders, dozers, motor graders, and other types of heavy machinery are used to perform a variety of tasks. During the performance of these tasks, the machines often operate in varying terrain, under erratic environmental conditions, in changing traffic situations, and with different sizes and types of loads. Because of the changing conditions under which the machines operate, performance of a particular machine may vary greatly depending on the particular travel path followed by the machine at any given time. Unfortunately, it may not always be easy for a human operator to properly plan a travel path that results in the accomplishment of a desired machine goal.

One attempt to improve travel path planning of a machine is described in U.S. Pat. No. 6,292,725 (the '725 patent) issued to Kageyama et al. In particular, the '725 patent describes an interference preventing system for a vehicle. The system prevents the interference of vehicles traveling on a road in opposite directions. Each vehicle may detect other vehicles, such as oncoming vehicles, and may decelerate or move to the shoulder of the road when an oncoming vehicle approaches. Thus, the system of the '725 patent may provide some help in route planning and machine guidance, but it may be less than optimal.

The system of the present disclosure is directed toward solving one or more of the problems set forth above and/or other problems of the prior art.

SUMMARY

In one aspect, the present disclosure is directed to a system for controlling a first machine performing a turn. The system includes a controller configured to identify a desired turn for the first machine. The desired turn is formed by two adjacent traffic lanes. The two traffic lanes include a first traffic lane and a second traffic lane. The controller is further configured to receive information regarding a second machine and determine whether to control the first machine to follow a lane crossing path for performing the desired turn based on the received information. The lane crossing path includes a portion of the first traffic lane and a portion of the second traffic lane such that the first machine changes between the first traffic lane and the second traffic lane to perform the desired turn.

In another aspect, the present disclosure is directed to a method for controlling a first machine performing a turn. The method includes identifying, using at least one processor, a desired turn for the first machine. The desired turn is formed by two adjacent traffic lanes. The two traffic lanes including a first traffic lane having a first normal direction of travel and a second traffic lane having a second normal direction of travel opposite the first normal direction of travel. The method also includes selecting between at least two paths for the first machine to follow around the desired turn. The at least two paths include a first path including only the first traffic lane, and a second path that changes between the first traffic lane and the second traffic lane such that the first machine travels opposite the second normal direction of travel when traveling in the second path on the second traffic lane.

In another aspect, the present disclosure is directed to a method for controlling a first machine performing a turn. The method includes identifying, using at least one processor, a desired turn for the first machine. The desired turn is formed by two adjacent traffic lanes. The two traffic lanes include a first traffic lane having a first normal direction of travel and a second traffic lane having a second normal direction of travel opposite the first normal direction of travel. The method also includes receiving, using the at least one processor, information associated with a second machine traveling in the second traffic lane, and determining, using the at least one processor, a speed and path of the first machine around the desired turn based on the received information. The path of the first machine changes between the first traffic lane and the second traffic lane such that the first machine travels opposite the second normal direction of travel when traveling on the second traffic lane.

DETAILED DESCRIPTION

Reference will now be made in detail to exemplary embodiments of the invention, examples of which are illustrated in the accompanying drawings. Wherever possible, the same reference numbers will be used throughout the drawings to refer to the same or like parts.

Figure 1:
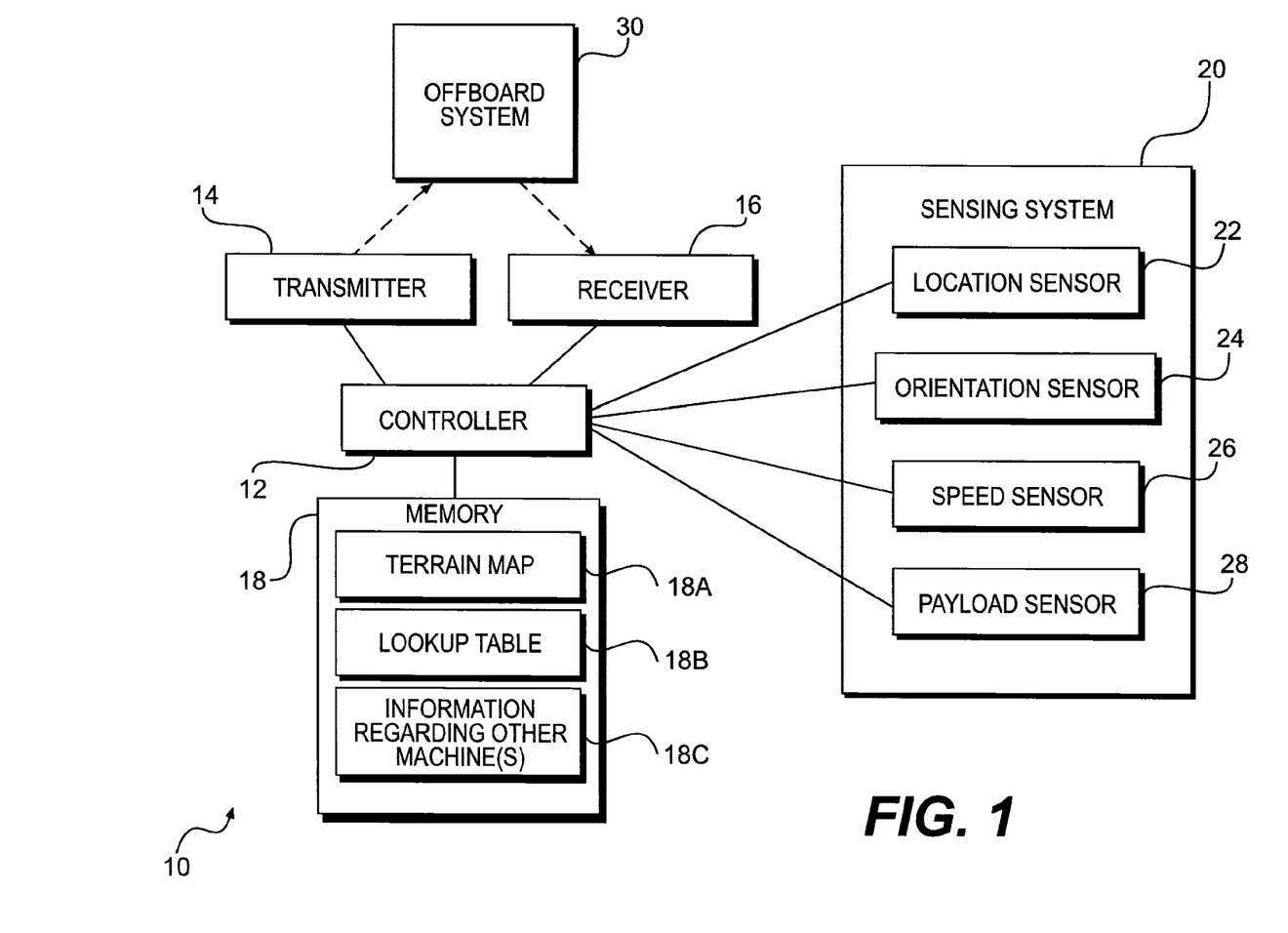
FIG. 1 is a schematic illustration of certain components associated with a machine and an offboard system, according to an embodiment.

FIG. 1 illustrates an embodiment of a mobile machine 10 configured to communicate with an offboard system 30 (e.g., a worksite control facility or other system located remotely from the machine 10). The machine 10 may be an autonomous mobile machine that performs some type of operation associated with an industry such as mining, construction, farming, freighting, or another industry. Alternatively, the machine 10 may be semi-autonomous or manned. Autonomous machines may be designed to operate without an operator (unmanned), and semi-autonomous machines may or may not be designed to operate with an operator. In any case, the machine 10 may be, for example, an on- or off-highway haul truck, or another type of mobile machine that may haul load material (payload). Alternatively, the machine 10 may be a motor grader, excavator, dozer, water truck, loader, compactor, scraper, passenger vehicle, or another type of mobile machine.

The machine 10 may include a controller 12, which may communicate with a transmitter 14 and a receiver 16, which are also included in or on the machine 10. The controller 12 may include one or more processors (not shown) configured to execute software for performing one or more functions consistent with the disclosed embodiments. The controller 12 may also communicate with one or more memory devices 18 included in the machine 10 and configured to store data and/or processes for performing one or more functions consistent with the disclosed embodiments, including computer programs and computer code used by the processor(s), that may be used to process data, such as the sensed parameters described below.

Figure 4:
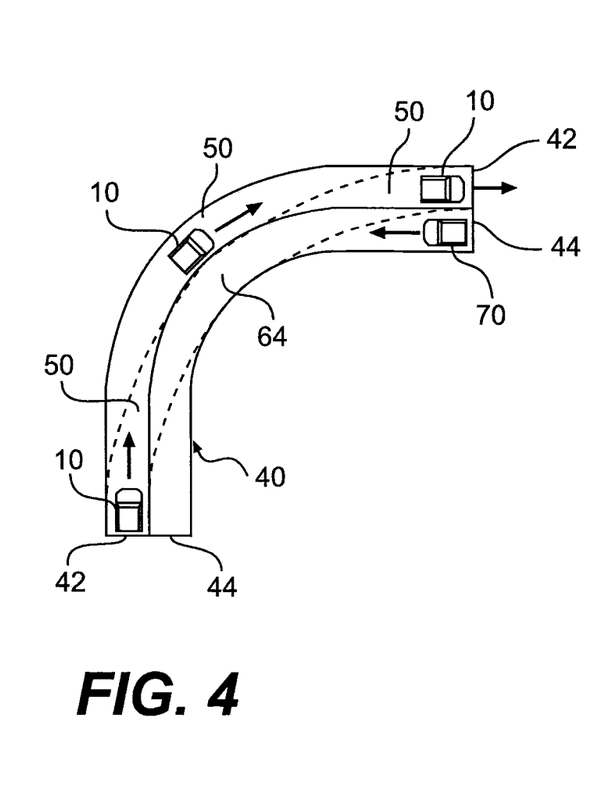
FIG. 4 is a schematic illustration of the alternate paths of a machine facing oncoming traffic, according to an embodiment.

The transmitter 14 may transmit, through a communications link, signals to the offboard system 30 and/or another machine 70 (FIG. 4). The transmitter 14 may include hardware and/or software that enables the transmitter 14 to transmit the signals through the communications link. The signals may include satellite, cellular, infrared, radio, and/or other types of wireless communication. Alternatively, the signals may include electrical, optical, and/or other types of wired communication. For example, the transmitter 14 may communicate signals indicative of various sensed operational characteristics of the machine 10 and/or other information as will be described below.

The receiver 16 may receive, through a communications link, signals from the offboard system 30 and/or another machine 70. The receiver 16 may include hardware and/or software that enables the receiver 16 to receive the signals through the communications link. The signals may include satellite, cellular, infrared, radio, and/or other types of wireless communication. Alternatively, the signals may include electrical, optical, and/or other types of wired communication. For example, the receiver 16 may receive signals indicative of an assigned task for the machine 10, information regarding the roads, information regarding the other machines 70 traveling along the roads, and/or other information as will be described below.

The controller 12 may also communicate with one or more devices of a sensing system 20 included in or on the machine 10. The sensing system 20 may be configured to monitor operational characteristics of the machine 10. For example, the sensing system 20 may include one or more of a location sensor 22, an orientation sensor 24, a speed sensor 26, and/or a payload sensor 28. Other sensing devices may be provided, e.g., a steering angle sensor, an accelerometer, a clock, etc. The sensors 22, 24, 26, and/or 28 may be physical (hardware) sensors that directly sense or measure the sensed parameter. Alternatively, the sensors 22, 24, 26, and/or 28 may also include virtual sensors that generate the signal indicative of the sensed parameter, e.g., based on a map-driven estimate.

The location sensor 22 may be configured to monitor a location of the machine 10. For example, the location sensor 22 may include a global navigation satellite system (GNSS) device (e.g., a global positioning system (GPS) device) configured to generate location data, e.g., coordinates (e.g., GPS coordinates or GNSS coordinates), elevation data, and/or other two-dimensional or three-dimensional location data, for the machine 10 based on data from a satellite, local tracking system, and/or any other position sensing system known in the art. The location sensor 22 may generate and communicate to the controller 12 a signal indicative of the determined location of the machine 10. The location data may be collected by the processor and/or stored in the memory 18.

The orientation sensor 24 may be configured to monitor an orientation of the machine 10. For example, the orientation sensor 24 may include one or more laser-level sensors, tilt sensors, inclinometers, radio direction finders, a gyrocompasses, a fluxgate compasses, and/or other known devices configured to determine a relative pitch, relative roll, and/or relative yaw of the machine 10. The orientation sensor 24 may also generate and communicate to the controller 12 a signal indicative of a heading or direction of travel of the machine 10 with respect to a coordinate system. The orientation data may be collected by the processor and/or stored in the memory 18.

The speed sensor 26 may be configured to determine a speed (e.g., a ground speed) of the machine 10, e.g., a speed of one or more traction devices (e.g., wheels, tracks, etc.) of the machine 10. The speed sensor 26 may generate and communicate to the controller 12 a signal indicative of the determined speed of the machine 10. The speed data may be collected by the processor and/or stored in the memory 18.

The payload sensor 28 may be configured to determine a payload of the machine 10, e.g., a weight of the payload carried by the machine 10. For example, the payload sensor 28 may include a torque sensor, a weight sensor, a pressure sensor, and/or other sensors configured to monitor the payload weight, as known in the art. Alternatively, the payload sensor 28 may indirectly monitor the payload by monitoring the pressure of struts in a suspension system (not shown), the pressure of cylinders in a truck bed hoist system (not shown), or the pressure of lift cylinders in a loader linkage (not shown), as known in the art. Other known systems may also be used. The payload sensor 28 may generate and communicate to the controller 12 a signal indicative of the determined payload of the machine 10. The payload data may be collected by the processor and/or stored in the memory 18.

The memory 18 may also store information about one or more roads 40 (FIGS. 2-4) at the worksite, such as a location of the roads 40 and other characteristics of the roads 40. For example, the stored characteristics of the roads 40 may include information regarding a radius of curvature, grade (or other parameter associated with an amount of slope generally parallel to a direction of travel along the road 40), superelevation (e.g., bank, cross slope, or other parameter related to an amount of slope generally perpendicular to a direction of travel along the road 40), material characteristic, and/or coefficient of friction. The material characteristic may include a parameter indicating a type of material forming the road 40 (e.g., asphalt, gravel, concrete, dirt, stone, rubber, and/or a mixture thereof), a road condition (e.g., slippery, wet, and/or icy), and/or indicating a material property of the road 40 (e.g., slipperiness (skid resistance), an estimated amount of water and/or ice on the road 40). The information about the roads 40 may be stored as a terrain map 18A or in another format.

The memory 18 may also store a lookup table 18B that correlates one or more of the operational characteristics of the machine 10 described above (e.g., sensed location, orientation, speed, payload, etc.), one or more other characteristics of the machine 10 (e.g., machine mass or weight), and/or one or more of the stored characteristics of the roads 40 (e.g., stored in connection with the terrain map 18A) with one or more control parameters for the machine 10. For example, the control parameter(s) may include control parameters associated with controlling a travel path (e.g., a steering angle and/or direction) and/or a speed of the machine 10. Alternatively, the lookup table 18B may be provided in another format, such as a map, chart, graph, or other manner of correlating and/or representing data.

The controller 12 may autonomously control the machine 10 using the lookup table 18B. For example, the controller 12 may determine the travel path and/or the speed of the machine 10 based on the characteristics of the machine 10 (e.g., sensed payload, machine mass or weight, etc.), and/or the stored characteristics of the roads 40 on which the machine 10 is traveling. The controller 12 may refer to the terrain map 18A to determine the stored characteristics of the road 40 for a portion of the road 40 along which the machine 10 is travelling or will travel, and input the stored characteristics of the road 40 and the characteristics of the machine 10 into the lookup table 18B in order to determine the travel path and/or the speed of the machine 10.

The memory 18 may also store information 18C regarding one or more other machines 70 traveling on the road(s) 40. The other machines 70 may be autonomous, semi-autonomous, and/or manned. For example, the information regarding other machine(s) 70 may include information associated with sensed location, sensed speed, and/or assigned tasks of the other machines 70. The controller 12 may also determine the travel path and/or the speed of the machine 10 based on the information 18C regarding the other machines 70 as will be described in detail below.

The memory 18 may also store other data, such as information regarding one or more assigned tasks for the machine 10, which is used by the controller 12 to control the machine 10. For example, the information regarding the assigned tasks may include information regarding the one or more roads 40 on which the machine 10 is assigned to travel, one or more tasks that the machine 10 is assigned to perform, and/or one or more locations where the machine 10 is assigned to perform the task(s) (e.g., a location for loading payload and/or a location for dumping payload, etc.).

The data described above that is stored in the memory 18 may be updated based on data received from the offboard system 30, another machine 70, etc. The update may be performed periodically and/or whenever the data changes. For example, the offboard system 30 may periodically send updated information regarding the roads 40 and updated information 18C regarding the other machines 70 to the controller 12. The offboard system 30 may send information regarding the assigned task for the machine 10 when the assigned task changes.

The machine 10 may travel between locations, e.g., at a worksite. The worksite may be, for example, a mine site, a landfill, a quarry, a construction site, a ski resort, a logging site, a road worksite, or another type of worksite known in the art. The locations between which the machine 10 may travel may include buildings, dig sites, aggregate collection sites, or other types of locations. The locations may be joined by the road(s) 40. The road(s) 40 may be unpaved and/or paved. Also, the road(s) 40 may or may not be marked to guide traffic, e.g., with solid or broken lines (such as center lines and other lines to separate and/or delineate traffic lanes), raised portions (such as rumble strips), and/or recessed portions. The machine 10 may travel along a route at the worksite determined based on the assigned task for the machine 10.

Figure 2:
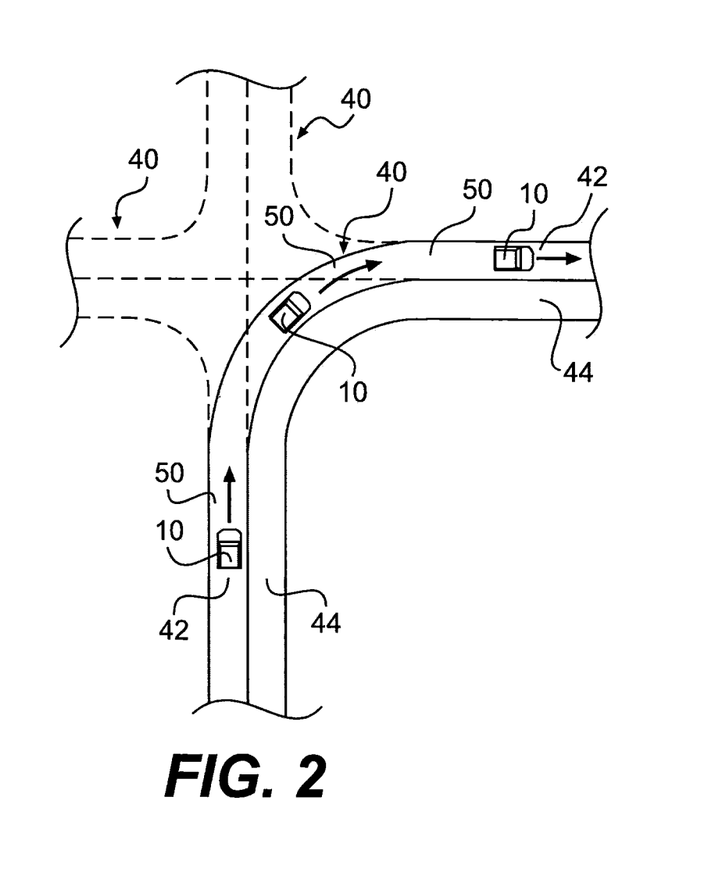
FIG. 2 is a schematic illustration of a path of a machine for performing a turn on a road, according to an embodiment.
Figure 3:
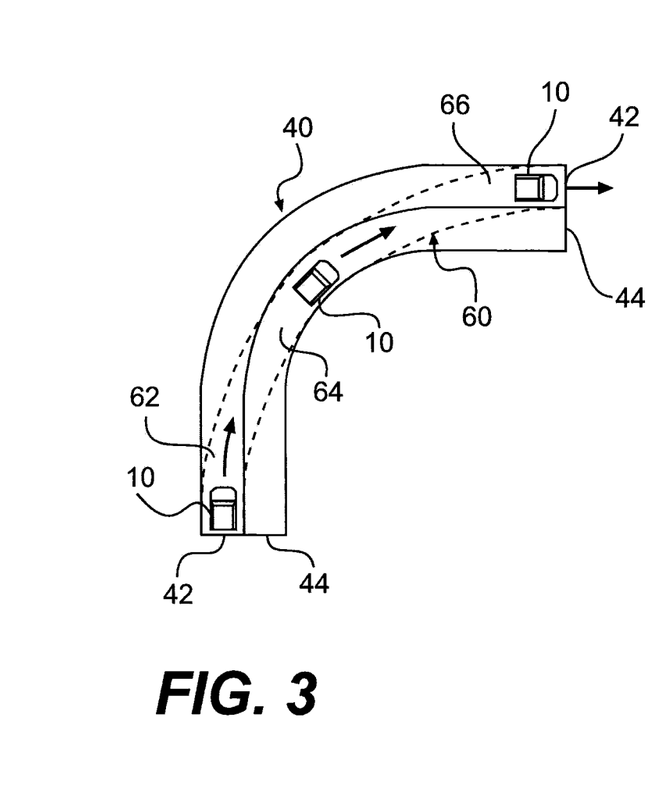
FIG. 3 is a schematic illustration of an alternate path of a machine for performing a turn on a road, according to an embodiment.

FIGS. 2-4 show the machine 10 traveling on the roads 40. Each road 40 may have multiple lanes of traffic. The roads 40 shown in FIGS. 2-4 include two lanes 42, 44 of traffic. The first lane 42 has a normal direction of travel that is opposite to a normal direction of travel of the second lane 44 such that traffic on the two lanes 42, 44 normally flows in opposite directions.

When traveling along a route at the worksite, the machine 10 may perform a turn. The turn may be formed by a bend in a single road 40, as shown by the solid lines in FIG. 2. Alternatively, as shown by the dashed lines in FIG. 2, the turn may be formed in an intersection between multiple (e.g., two or more) roads 40. The two roads 40 may intersect at a four-way junction, and the machine 10 may perform a turn at the intersection of the two roads 40. Alternatively, the machine 10 may perform the turn along another type of intersection between multiple roads 40, such as a T-junction, a fork, a five-way intersection, etc.

As shown in the embodiment of FIG. 2, the lanes 42, 44 may follow along the turn such that the portion of the first lane 42 forming the turn has an average radius of curvature that is greater than an average radius of curvature of the portion of the second lane 44 forming the turn. Also, as shown in the embodiment of FIG. 2, the turn may be approximately 90 degrees, e.g., measured by a change in direction of travel of the machine 10 at a start point of the turn and at an end point of the turn. Alternatively, the turn may be greater than approximately 90 degrees, such as approximately 105 degrees, approximately 120 degrees, a U-turn, etc. As another alternative, the turn may be lesser than approximately 90 degrees, such as approximately 75 degrees, approximately 60 degrees, etc. As another alternative, the turn may be within a range of approximately 75 degrees to approximately 105 degrees, or approximately 60 degrees to approximately 120 degrees, etc. The start point of the turn may be a location where the machine 10 begins a change in direction, and the end point of the turn may be a location where the machine 10 completes the change in direction. For example, FIGS. 2-4 show the machine 10 located near three points of the turn: a start point, an intermediate point between the start and end points, and an end point.

FIGS. 2-4 show alternate paths 50, 60 that the machine 10 may follow to perform the turn. FIGS. 2 and 4 show the machine 10 performing the turn by following a first path 50. The first path 50 may be contained only within the first lane 42 and is a standard path for the machine 10 to follow when turning. FIG. 3 shows the machine 10 cutting the corner by following a second path 60. The second path 60 may include portions contained within both the first and second lanes 42 and 44 so that the machine 10 changes at least once between the first and second lanes 42, 44 when performing the turn. For example, in the embodiment of FIG. 3, the second path 60 includes a first portion 62 in the first lane 42, a second portion 64 in the second lane 44, and a third portion 66 in the first lane 42 so that the machine 10 starts the turn in the first lane 42, crosses into the second lane 44 in the middle of the turn, and then finishes the turn back in the first lane 42. Alternatively, the second path 60 may omit the third portion 66 so that the machine 10 may complete the turn in the second lane 44. The machine 10 may then cross back into the first lane 42 after completing the turn.

As described below, the controller 12 may determine whether the machine 10 follows the first path 50 or the second path 60 based on the data stored in the memory 18 as described above.

INDUSTRIAL APPLICABILITY

Figure 5:
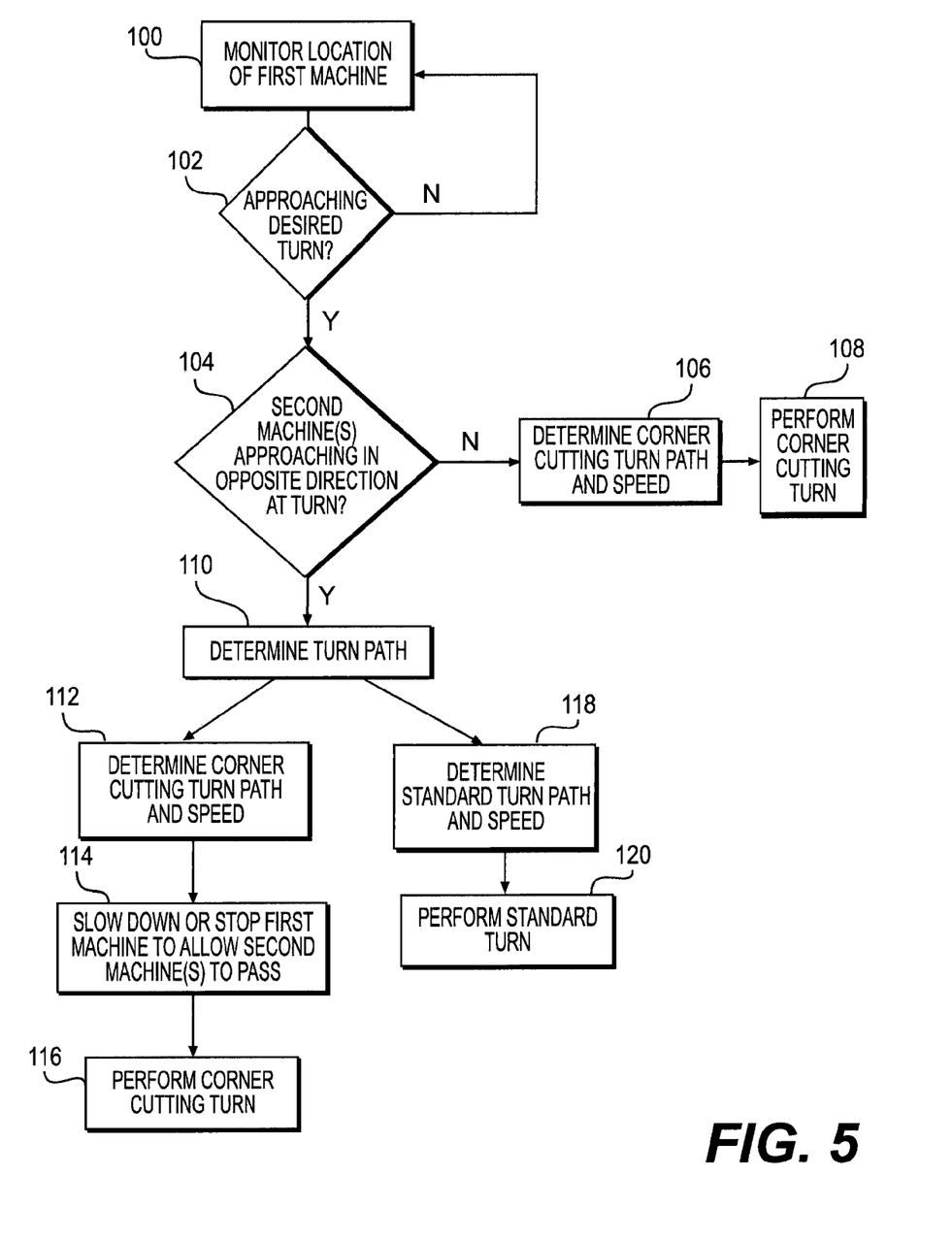
FIG. 5 is a flow chart illustrating a method for controlling a machine, according to an embodiment.

The disclosed control system and method may have particular applicability with autonomously controlled machines. The disclosed control system and method may determine and/or adjust the path 50, 60 of the machine 10 for performing a desired turn to allow the machine 10 to efficiently perform the turn. With reference to FIG. 5, operation of the machine 10 will now be described.

The machine 10 may travel on the road(s) 40, e.g., when performing an assigned task. In an embodiment, as shown in FIG. 5, the controller 12 may monitor the location of the machine 10 (step 100). For example, the controller 12 may determine the location of the machine 10 using the location sensor 22. Optionally, the controller 12 may also monitor the orientation and/or the speed of the machine 10, e.g., using the orientation sensor 24 and/or the speed sensor 26.

The controller 12 may identify a desired turn (a turn that the machine 10 is desired to perform) and determine if the machine 10 is approaching the desired turn (step 102). For example, before beginning the turn, the controller 12 may identify the desired turn and determine if the machine 10 is approaching the desired turn based on the terrain map 18A and the location monitored in step 100. The controller 12 may make the determination if the machine 10 is within a particular distance from the desired turn and/or if the machine 10 is predicted to reach the desired turn within a particular period of time (e.g., based on the sensed speed and/or orientation of the machine 10). If the controller 12 determines that the machine 10 is not approaching a desired turn (step 102; no), then the controller 12 may continue to monitor the location of the machine 10 (step 100).

If the controller 12 determines that the machine 10 is approaching a desired turn (step 102; yes), the controller 12 may determine if another machine 70 is approaching the machine 10 in the opposite direction at the desired turn (step 104). For example, as shown in FIG. 4, the other machine 70 may be approaching the machine 10 in the opposite lane 44 than the lane 42 on which the machine 10 is traveling. The controller 12 may make the determination based on the terrain map 18A and/or the received information 18C regarding other machine(s) 70. For example, the controller 12 may determine the location and/or speed of the other machine 70, and may use the terrain map 18A to determine whether the other machine 70 is traveling in the opposite lane 44. Also, the controller 12 may predict, based on the location and/or speed of the other machine 70, whether the other machine 70 will travel along the desired turn at the same time as the machine 10.

If the controller 12 determines that another machine 70 is not approaching the machine 10 in the opposite direction at the desired turn (step 104; no), then the controller 12 may control the machine 10 to perform a corner cutting turn (e.g., the second path 60 shown in FIGS. 3 and 4). The controller 12 may determine the second path 60 (e.g., a geometry of the second path 60) and the speed of the machine 10 for performing the corner cutting turn using the second path 60 (step 106). For example, as noted above, the second path 60 may include at least the first portion 62 in the first lane 42 and at least the second portion 64 in the second lane 44 so that the machine 10 changes from the first lane 42 to the second lane 44 in the middle of the turn. In an embodiment as shown in FIG. 3, the second path 60 may also include the third portion 66 in the first lane 42 so that the machine 10 may cross back into the first lane 42 before completing the turn. Since the second path 60 crosses lanes 42 and 44 at least once, the second path 60 may have a larger average radius of curvature than the standard turn (e.g., the first path 50 shown in FIGS. 2 and 4).

Since the second path 60 for the corner cutting turn has a larger average radius of curvature than the standard turn and is therefore closer to a straight line than the first path 50 for the standard turn, the machine 10 may travel a shorter length (distance) when cutting the corner compared to when performing a standard turn. Also, since the average radius of curvature is larger, the controller 12 may control the machine 10 to travel at a higher speed when cutting the corner compared to when performing the standard turn. As a result, the machine 10 may perform the corner cutting turn faster than the standard turn, which may reduce time and costs for performing an assigned task, thereby increasing efficiency.

The geometry of the second path 60 and/or the speed of the machine 10 may also be determined based on the terrain map 18A and/or the lookup table 18B. For example, the geometry and/or the speed may depend on the geometry (e.g., radius of curvature, width, length (e.g., along the centerline), etc.) of the lanes 42, 44, as indicated in the terrain map 18A. Also, the geometry of the second path 60 and/or the speed of the machine 10 may be determined (e.g., using the lookup table 18B) based on the stored characteristics of the roads 40, e.g., grade, superelevation, material composition, and/or coefficient of friction of the portions of the lanes 42, 44 forming the second path 60, and/or based on characteristics of the machine 10, e.g., sensed payload and/or machine mass or weight. The determined speed of the machine 10 may vary or may be constant along the length of the second path 60. When the machine 10 arrives at the desired turn, the machine 10 may perform the corner cutting turn using the second path 60 determined in step 106 at the determined speed (step 108).

Alternatively, if the controller 12 determines that another machine 70 is approaching the machine 10 in the opposite direction at the desired turn (step 104; yes), then the controller 12 may determine the path to follow to perform the turn (e.g., the corner cutting second path 60 or the standard first path 50) (step 110). This step may be performed before beginning the turn and/or while the machine 10 is performing the turn.

In an embodiment, the determination of which path to take may be made based on the amount of traffic in the second lane 44, as determined by the controller 12 based on the received information 18C regarding other machine(s) 70. For example, if the controller 12 identifies another machine 70 that is traveling (or will travel) along the desired turn at the same time as the machine 10, then the controller 12 may determine whether it is more efficient to: stop or slow down the machine 10 to allow the other machine(s) 70 to pass and then follow the corner cutting second path 60, or follow the standard first path 50. This determination may be made based on various factors, e.g., an amount of traffic in the second lane 44, a calculation of the difference in efficiency (e.g., cost and/or time savings, etc.) between the two possible paths, etc. For example, if there is heavy traffic in the second lane 44, then the controller 12 may control the machine 10 to follow the standard first path 50. As another example, if it is more efficient (e.g., resulting in a cost and/or time savings) to stop or slow down the machine 10 temporarily to allow the other machine(s) 70 to pass the machine 10 before the machine 10 changes into the second lane 44 in the second path 60, then the controller 12 may control the machine 10 to follow the corner cutting second path 60.

If the controller 12 decides to control the machine 10 to follow the corner cutting second path 60, the controller 12 may determine the second path 60 (e.g., a geometry of the second path 60) and the speed of the machine 10 for performing the corner cutting turn (step 112). Alternatively, this step may be performed when determining which path to take in step 110. The controller 12 may determine the second path 60 and the speed of the machine 10 as described above in connection with step 106 (e.g., based on the terrain map 18A and/or the lookup table 18B) and also based on the information 18C regarding other machine(s) 70. For example, the controller 12 may determine the location and/or speed of the other machine(s) 70, and may use the sensed location and/or speed of the other machine(s) 70 to determine when the other machine(s) 70 passes the second portion 64 of the second path 60 that is located in the second lane 44. Based on this information, the controller 12 may then determine whether to slow down or stop the machine 10 to allow the other machine(s) 70 to pass the second portion 64 of the second path 60 before allowing the machine 10 to cross into the second lane 44 at the second portion 64. The controller 12 may also determine the speed to which to slow the machine 10, and an amount of time to stop the machine 10 or hold the machine 10 at the reduced speed. The controller 12 may also determine whether to slow down or stop the machine 10 in the first lane 42 before beginning the turn, or slow down or stop the machine 10 in the first portion 62 of the second path 60 after beginning the turn. The controller 12 may also determine where to cross into the second lane 44 and/or where to cross back into the first lane 42 based on the information 18C regarding the other machine(s) 70 in order to avoid a collision between the machines 10 and 70.

The controller 12 may control the machine 10 to slow down or stop before reaching the second portion 64 of the second path 60 to allow the other machine 70 to pass (step 114). As a result, the machine 10 may avoid crossing into the oncoming traffic in the second lane 44. After the other machine 70 passes the portion of the second lane 44 that forms the second portion 64 of the second path 60, the machine 10 may increase its speed and pass into the second portion 64 of the second path 60 and then may complete the turn (step 116). Steps 114 and 116 may be performed using the geometry of the second path 60 and/or the speed of the machine 10 determined in step 112 (or step 110).

Alternatively, if the controller 12 decides to control the machine 10 to follow the standard first path 50 at step 110, the controller 12 may determine the first path 50 (e.g., a geometry of the first path 50) and the speed of the machine 10 for performing the standard turn (step 118). Alternatively, this step may be performed when determining which path to take in step 110. The controller 12 may determine the geometry of the first path 50 and/or the speed of the machine 10 based on the terrain map 18A and/or the lookup table 18B. For example, the geometry and/or the speed may depend on the geometry (e.g., radius of curvature, width, length (e.g., along the centerline), etc.) of the first lane 42, as indicated in the terrain map 18A. Also, the geometry of the first path 50 and/or the speed of the machine 10 may be determined (e.g., using the lookup table 18B) based on the stored characteristics of the roads 40, e.g., grade, superelevation, material composition, and/or coefficient of friction of the portion of the first lane 42 forming the first path 50, and/or based on characteristics of the machine 10, e.g., sensed payload and/or machine mass or weight. The determined speed of the machine 10 may vary or may be constant along the length of the first path 50. When the machine 10 arrives at the desired turn, the machine 10 may perform the standard turn using the first path 50 determined in step 118 at the determined speed (step 120).

The controller 12 may also continuously receive information regarding the location of other machines 70, and may dynamically determine the geometry of the path of the machine 10 and/or the speed of the machine 10 while performing the turn. Thus, in an embodiment, even after the machine 10 begins to perform the standard turn (step 120), the controller 12 may decide to change the path to cut the corner instead (step 106 or 112), e.g., if the controller 12 receives updated information regarding the other machine(s) 70 and determines that there is no danger of the machine 10 contacting another machine 70. In another embodiment, even after the machine 10 begins to cut the corner (step 116), the controller 12 may decide to change the path to perform the standard turn instead (step 118), e.g., if the controller 12 receives updated information regarding the other machine(s) 70 and determines that it would be more efficient to perform the standard turn. Thus, the controller 12 may dynamically determine the geometry of the path of the machine 10 and/or the speed of the machine 10 while performing the turn.

As a result, the controller 12 may autonomously control the machine 10 to cut corners when possible to increase efficiency of the machine 10. The controller 12 may use information, such as information regarding the roads 40, information regarding the machine 10, and/or information regarding other machines 70, to determine the path of the machine 10 when turning, to control the speed of the machine 10 when turning, and to determine whether or not to cut the corner. The information regarding other machines 70 may allow the controller 12 to control the machine 10 to cut corners safely and to avoid crossing into oncoming traffic, thereby reducing the risk of a crash.

Although the embodiments described above relate to adjusting the path of the machine 10 to cross into the adjacent lane 44 of opposing traffic to cut the corner, it is to be understood that the controller 12 may also perform similar steps to determine whether to adjust the path of the machine 10 when performing a turn to cross into other types of lanes. For example, the controller 12 may determine whether to adjust the path of the machine 10 to turn wide, thereby crossing into an adjacent lane of opposing traffic having a larger average radius of curvature.

It will be apparent to those skilled in the art that various modifications and variations can be made to the disclosed method and system. Other embodiments will be apparent to those skilled in the art from consideration of the specification and practice of the disclosed method and system. It is intended that the specification and examples be considered as exemplary only, with a true scope being indicated by the following claims and their equivalents.

What is claimed is:

1. A system for controlling a first machine performing a turn, the system comprising:
   a controller configured to:
      identify a desired turn for the first machine, the desired turn being formed by two adjacent traffic lanes, the two traffic lanes including a first traffic lane and a second traffic lane, the first traffic lane having a first normal direction of travel, the second traffic lane having a second normal direction of travel opposite the first normal direction of travel, the second traffic lane having an average radius of curvature associated with the desired turn that is smaller than an average radius of curvature of the first traffic lane associated with the desired turn,
      receive information regarding a second machine,
      determine whether to control the first machine to follow a lane crossing path for performing the desired turn based on the received information, the lane crossing path including a portion of the first traffic lane and a portion of the second traffic lane such that the first machine moves from the first traffic lane to the second traffic lane to perform the desired turn along a larger average radius of curvature than the average radius of curvature of the first traffic lane, and
      determine a speed of the first machine for performing the desired turn based on a terrain map, a payload loaded into the first machine, and a weight or a mass of the first machine.

2. The system of claim 1, wherein the information regarding the second machine includes at least one of a location or speed of the second machine.

3. The system of claim 1, wherein the controller is further configured to:
   control the first machine to follow the lane crossing path; and
   control the speed of the first machine for performing the desired turn using the lane crossing path based on the information regarding the second machine to avoid contacting the second machine.

4. The system of claim 1, wherein the controller is further configured to:

control the first machine to follow the lane crossing path; and control the first machine by stopping or reducing the speed of the first machine when using the lane crossing path based on the received information regarding the second machine.

5. The system of claim 1, wherein the controller is further configured to control the first machine to follow the lane crossing path and to begin crossing into the portion of the second traffic lane in the lane crossing path after the second machine has passed the portion of the second traffic lane.

6. The system of claim 1, wherein the controller is further configured to select between the lane crossing path or a first path including only the first traffic lane, the selection being based on the received information.

7. The system of claim 6, wherein:
the determined speed of the first machine is further based on the selection.

8. The system of claim 1, wherein the controller is further configured to determine the speed of the first machine for performing the desired turn further based on a grade, cross slope, material composition, and coefficient of friction of at least one of the first and second traffic lanes stored in the terrain map.

9. The system of claim 8, wherein the controller is in communication with a memory, and the controller is further configured to determine the speed of the first machine for performing the desired turn based on a lookup table stored in the memory.

10. The system of claim 1, wherein the controller is further configured to receive the information regarding the second machine while performing the desired turn and adjust a path of the first machine while performing the desired turn.

11. The system of claim 1, wherein the controller is further configured to:
receive information regarding the desired turn including at least one of a location or a geometry of the desired turn; and
determine a geometry of the lane crossing path based on the received information regarding the desired turn.

12. The system of claim 1, wherein the first machine is an autonomous machine.

13. A method for controlling a first machine performing a turn, the method comprising:
identifying, using at least one processor, a desired turn for the first machine, the desired turn being formed by two adjacent traffic lanes, the two traffic lanes including a first traffic lane having a first normal direction of travel and a second traffic lane having a second normal direction of travel opposite the first normal direction of travel, the second traffic lane having an average radius of curvature associated with the desired turn that is smaller than average radius of curvature of the first traffic lane associated with the desired turn;
selecting between at least two paths for the first machine to follow around the desired turn, the at least two paths including:
a first path including only the first traffic lane, and
a second path such that the first machine moves from the first traffic lane to the second traffic lane to perform the desired turn along a larger average radius of curvature than the average radius of curvature of the first traffic lane, and such that the first machine travels opposite the second normal direction of travel when traveling in the second path on the second traffic lane; and determining, using the at least one processor, a speed of the first machine based on the average radius of curvature, a grade, and a cross slope of at least one of the first and second traffic lanes, a payload loaded into the first machine, and a weight or mass of the first machine.

14. The method of claim 13, further including receiving information regarding a second machine traveling in the second traffic lane, the selection between the at least two paths being based on the received information.

15. The method of claim 14, wherein the received information regarding the second machine includes at least one of a location or speed of the second machine.

16. A method for controlling a first machine performing a turn, the method comprising:
identifying, using at least one processor, a desired turn for the first machine, the desired turn being formed by two adjacent traffic lanes, the two traffic lanes including a first traffic lane having a first normal direction of travel and a second traffic lane having a second normal direction of travel opposite the first normal direction of travel, the second traffic lane having an average radius of curvature associated with the desired turn that is smaller than an average radius of curvature of the first traffic lane associated with the desired turn;
receiving, using the at least one processor, information regarding a second machine traveling in the second traffic lane;
determining, using the at least one processor, a speed and path of the first machine around the desired turn based on the received information, the path of the first machine changing from the first traffic lane to the second traffic lane to perform the desired turn along a larger average radius of curvature than the average radius of curvature of the first traffic lane, and such that the first machine travels opposite the second normal direction of travel when traveling on the second traffic lane, the speed and path of the first machine being determined based on a terrain map, a payload loaded into the first machine, and a weight or mass of the first machine; and
operating the first machine in response to the determination of the speed and path of the first machine.

17. The method of claim 16, wherein the received information regarding the second machine includes at least one of a location or speed of the second machine.

18. The method of claim 16, wherein the first machine is an autonomous machine; and the second machine is an autonomous machine or a manned machine.

19. The system of claim 1, wherein the controller is configured to determine the speed of the first machine for performing the desired turn further based on the average radius of curvature, a grade, and a cross slope of at least one of the first and second traffic lanes stored in the terrain map.

20. The system of claim 19, wherein the controller is configured to determine the speed of the first machine for performing the desired turn further based on a length of at least one of the first and second traffic lanes stored in the terrain map.

21. The method of claim 16, wherein the speed and path of the first machine for performing the desired turn is determined further based on the average radius of curvature, a grade, and a cross slope of at least one of the first and second traffic lanes stored in the terrain map.

* * * * *